United States Patent [19]

Bowker

[11] 3,836,246

[45] Sept. 17, 1974

[54] IMAGE STANDARDIZER APPARATUS

[75] Inventor: John Kent Bowker, Marblehead, Mass.

[73] Assignee: Itek Corporation, Lexington, Mass.

[22] Filed: May 2, 1973

[21] Appl. No.: 356,672

Related U.S. Application Data

[62] Division of Ser. No. 181,141, Sept. 3, 1971, Pat. No. 3,778,541.

[52] U.S. Cl. .......................... 355/32, 355/1, 355/40, 355/71, 356/173

[51] Int. Cl. .......................................... G03b 27/76

[58] Field of Search ............... 355/1, 32, 35, 40, 43, 355/45, 71; 356/175–177, 178, 173, 179; 178/5

[56] References Cited

UNITED STATES PATENTS

| | | | |
|---|---|---|---|
| 2,388,842 | 11/1945 | Hanson, Jr. | 355/35 |
| 3,315,561 | 4/1967 | Boutique | 355/45 |
| 3,443,868 | 5/1969 | Mitchell | 355/32 |
| 3,690,763 | 9/1972 | Mitchell | 355/35 X |

*Primary Examiner*—Richard A. Wintercorn
*Attorney, Agent, or Firm*—Homer O. Blair; John E. Toupal; Gerald H. Glanzman

[57] ABSTRACT

Disclosed is a color standardizer for standardizing input specimens utilized with a system that analyzes a plurality of input images. The standarizer receives a multi-colored input sample and a comparator analyzes preselected properties of the input sample with respect to a preselected standard. Corrective filters are utilized to alter the color balance and tone of the input sample so as to be compatible with the system. A camera records the suitably altered image. Furthermore, cropping and focusing apparatus are included so that the image output of the standardizer is of a uniform size.

6 Claims, 4 Drawing Figures

IMAGE STANDARDIZER APPARATUS

CROSS REFERENCED TO RELATED TO APPLICATIONS

This application is a division of my co-pending U.S. application Ser. No. 181,141, filed Sept. 3, 1971 now U.S. Pat. No. 3,778,541 issued Dec. 11, 1973 and entitled "System for Analyzing Multi-Colored Scenes."

BACKGROUND OF THE INVENTION

This invention relates generally to color analysis equipment and, more particularly, to a standardizer for use in conjunction with a system that analyzes a plurality of color scenes, the standardizer providing input specimens of a uniform size and color balance from a plurality of samples of varying size and color balance.

The ability to color analyze a variety of input samples is useful in many fields. For example, in the field of color television it may be desired to broadcast facsimiles of a plurality of input images, such as color photographs. However, if the image sizes vary it becomes difficult to rapidly change input samples. Consequently, a problem can develop if the number of samples is large. This problem can be compounded if the images are of different formats such as a mixture of color prints and color slides. Furthermore, if there are variations in color tone among the samples, an unpleasant visual effect occurs as the images are changed.

Another example of a system in which color analysis is performed is disclosed in my referenced U.S. application. A plurality of input images is analyzed and a paint-by-number type craft kit is produced corresponding to each image. Clearly, the aforementioned problems of varying input sizes and formats are evident in the paint-by-number analyzer. In addition, the provision of input samples of uniform color tone is of great importance in this system because of the nature of the color analysis utilized. The paint-by-number system requires that for each color observed and analyzed a representative color from a group of preselected colors must be selected. If the color tone of a sample is too different from the "ideal" tone around which the system was designed an unsatisfactory analysis can occur. For example, facial tones in a given sample may contain a greater green component than the facial tones for which the analysis system was designed. In that event, it is possible that the system may select a shade of green to represent what should be facial tones. The importance of providing input images with a uniform color tone will therefore be appreciated.

It is an object of this invention, therefore, to provide a color standardizer that will produce input samples of standard size, format and color tone from specimens of varying size, format and color tone.

SUMMARY OF THE INVENTION

This invention is characterized by a color standardizer including a comparator for comparing an input sample to a standard color image and further includes a plurality of color correction filters for altering the color tone of the input sample to more closely match the color tone of the standard image. In the example described in my referenced application, that of a system for producing paint-by-number craft kits from input images, the color analysis is more efficient when each input image to be analyzed is of a standard color tonality. Furthermore, the standardizer includes a cropping system and a camera for recording the color corrected input samples in a uniform format and size. In the standardizer described below all input samples are reproduced on a 70 mm color transparency strip. Standardization of the input scenes, both with respect to size and color tone, enhances the speed capability of the system for producing paint-by-number kits described in my prior application. A further advantage of re-recording, or photographing, all the input specimens is that auxiliary information useful in the overall analysis process can be simultaneously recorded on the 70 mm strip. For example, fiducial, or code marks are recorded to provide control signals for the computers utilized in the paint-by-number system. Also, the system is simplified in that scanning, which is part of the analysis process, can be controlled by the fiducial marks rather than computations such as scan counting.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENTS

Figure 1:
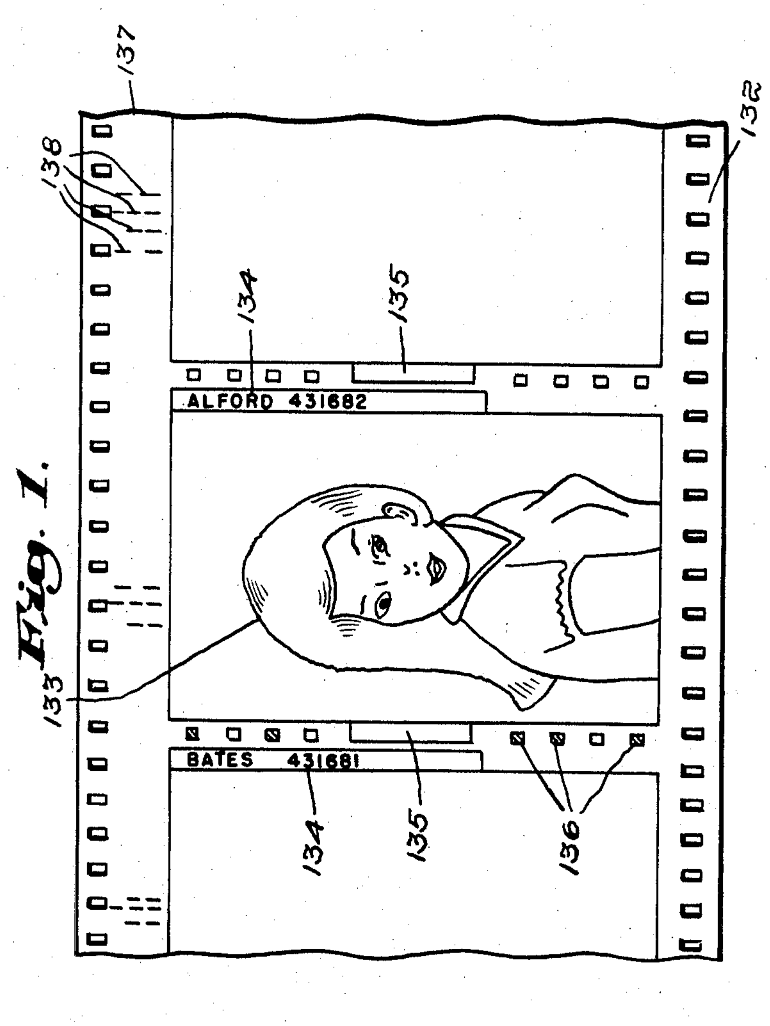
FIG. 1 shows a portion of a transparency strip retaining standardized input images.

Referring to FIG. 1 there is shown the format used on a 70 millimeter transparency strip 132 that is made from the original input specimens. The image from the original input specimen is photographed and appears on the strip 132. For example, in FIG. 1 the portrait of a young woman 133 appears. Also included on the transparency strip 132 is information not originally on the input specimen. This information includes data 134 to identify the input sample, a color control patch 135 and other color information 136 that is used as explained in my referenced application Ser. No. 181,141. On one side 137 of the transparency strip 132 is a series of fiducial marks 138. The instructions contained in the machine readable fiducial marks 138 control the direction of the scan, and program the scanner (described in application Ser. No. 181,141) to read either normal picture information, the data 134 or the supplementary color control information 135 and 136. Since the size and shape of the output print produced in the paint-by-number system are controlled by indications on the transparency strip 132 and the output print is produced from a roll of sensitized paper greater system flexibility is obtained. This is because the size and shape of the output print can be changed with no alterations in the system. Furthermore, when system control is supplied by the fiducial marks 138 the entire system is simplified as compared to a system in which a scanner is controlled by computations, such as scan counting, made internally. The fiducial marks 138 are read by conventional techniques and the equipment used is not shown.

Figure 2:
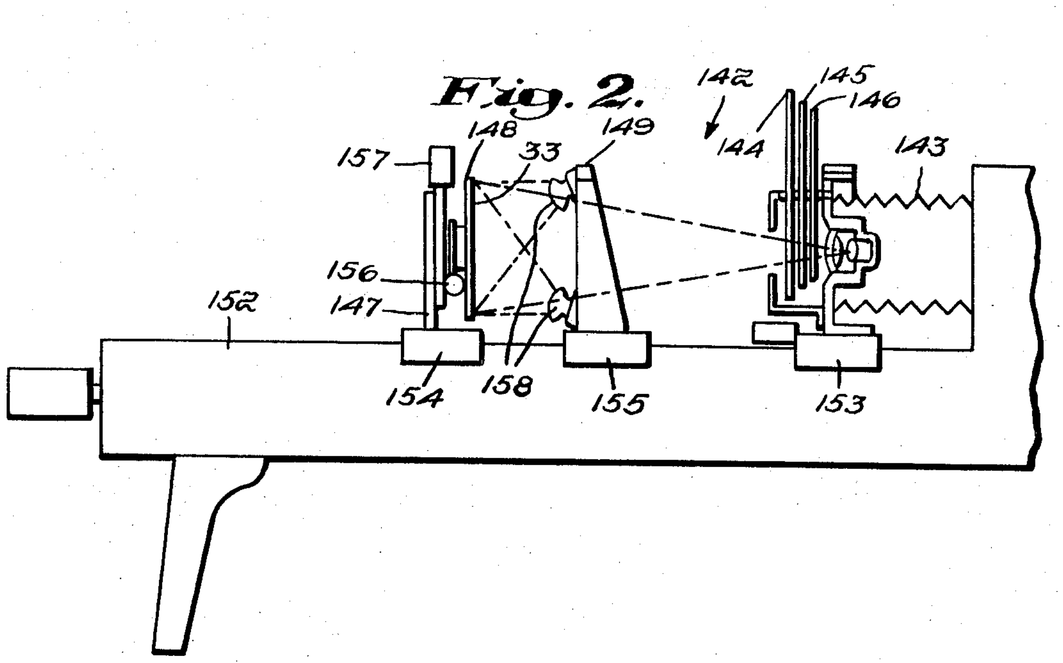
FIG. 2 is an elevation view of a standardizer including a camera for providing the transparency strip shown in FIG. 1.

Referring next to FIG. 2 there is shown a diagram of a standardizer 142 that includes a camera 143, a plurality of corrective filters 144, 145 and 146 and an input support 147 with a cropping platten 148. The standardizer 142 also includes a comparator that will be described below. The corrective filters include a neutral density filter 144, a plus or minus red filter 145 and a plus or minus blue filter 146. The camera 143 is a reflex type and the viewing system will be described below. The camera 143, the input support 147 and a lamp support 149 are mounted on a rail 152 with sliding brackets 153, 154 and 155 respectively. The cropping platten 148 can be moved vertically or horizontally by a y-drive motor 156 and an x-drive motor 157 respectively and mounted on the cropping platten is an input specimen 33. The lamp support 149 carries a plurality of lamps 158 that illuminate the input specimen 33. The camera 143 is focused by moving the bracket 153 on the rail 152. Correct cropping is achieved by moving the mounts 154 and 155 on the rail to provide the proper magnification or reduction and actuating the x and y motors 157 and 156, respectively to position the input specimen 33 in the event that the image thereon is off center. The standardizer 142 that is used with transparency input specimens 33 is similar except that the transparencies are illuminated from behind. Focusing and cropping procedures are similar.

Figure 3:
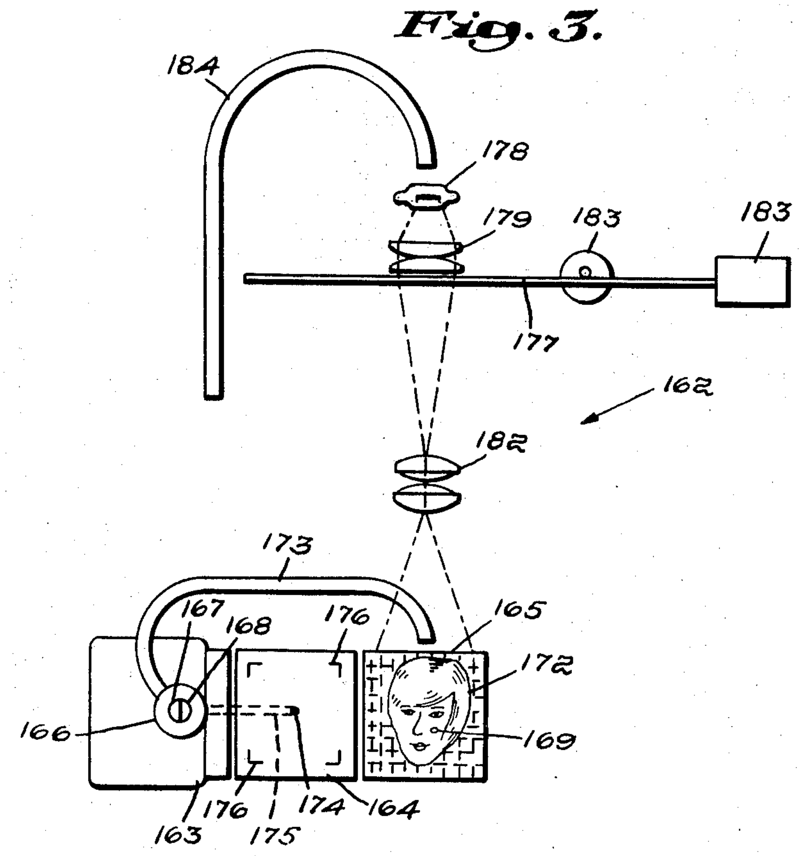
FIG. 3 is a schematic diagram of the viewing system used in the camera shown in FIG. 2.

Referring now to FIG. 3 there is shown a schematic diagram of a comparator 162 that is part of the viewing system of the camera 143. On the operator's control panel (not shown) are a comparator viewfinder 163, an object image viewing screen 164 and a reference viewing screen 165. In the comparator viewfinder 163 is an eyepiece 166, the viewing area of which is divided into two semi-circular segments 167 and 168. Shown in the area 167 is a small preselected portion 169 of an image 172 from the reference image viewing screen 165. A fiber optic light pipe 173 carries the image of the small portion 169 to the area 167. Shown in the area 168 is a small portion 174 of the image shown in the object viewing screen 164, that is the image shown on the input specimen 33. A movable probe 175 is adjusted to select the position of the small portion 174 and carry the image thereof to the area 168. In a preferred embodiment the eyepiece 166 exhibits a magnification of approximately 10 power to simplify comparison of the areas 167 and 168. Below the viewing screens 164 and 165 are mirrors (not shown). The mirror below the screen 164 is a conventional movable mirror as found in reflex camera viewfinders that reflects the image to the viewing screen 164 but is automatically moved during exposure. The mirror below the screen 165 is permanently fixed and reflects the image 172 to the screen 165. Also on the viewing screen 164 are fiducial marks 176 to aid in the positioning and cropping of the input specimen 33. The image 172 on the reference viewing screen 165 is supplied by a transparency sheet 177 that is illuminated by a reference lamp 178 and focused by a set of condensing lenses 179 and objective lenses 182. It will be apparent that a sheet of prints with front illumination could be used to supply the reference image 172 if desired. A plurality of individual images 172 are contained on the transparency sheet 177 and selector motors 183 are used to position the desired image 172 between the lenses 179 and 182. The plurality of images 172 comprises photographic subjects of various facial colors and the image 172 selected for any individual input specimen 33 that is a photograph of a person of the facial type corresponding most closely to the person shown on the input specimen. The light pipe 173 is disposed so that a medium skin tone of the reference image 172 is shown in the area 167. Likewise, the probe 175 is positioned so that a medium skin tone from the input specimen 33 is shown in the area 168. The reference image 172 is used for color comparison and correlation purposes as described below. However, variations in the color temperature of the lamp 178 caused by lamp aging or voltage variations will affect the color balance of the image 172. Therefore, a record of the condition of the lamp 178 is made by taking a sample of light through a fiber optics light pipe 184 that is focused on the transparency strip 132 to expose the color control patch 135 as shown in FIG. 1. In order to preserve clarity, the lenses and mirrors utilized in focusing the color control patch 135 are not shown. A plurality of small light bulbs near the shutter of the camera 143 that expose the color code patches 136 are not shown in order to preserve clarity. The conventional focusing system used for the data 134 is also omitted.

Figure 4:
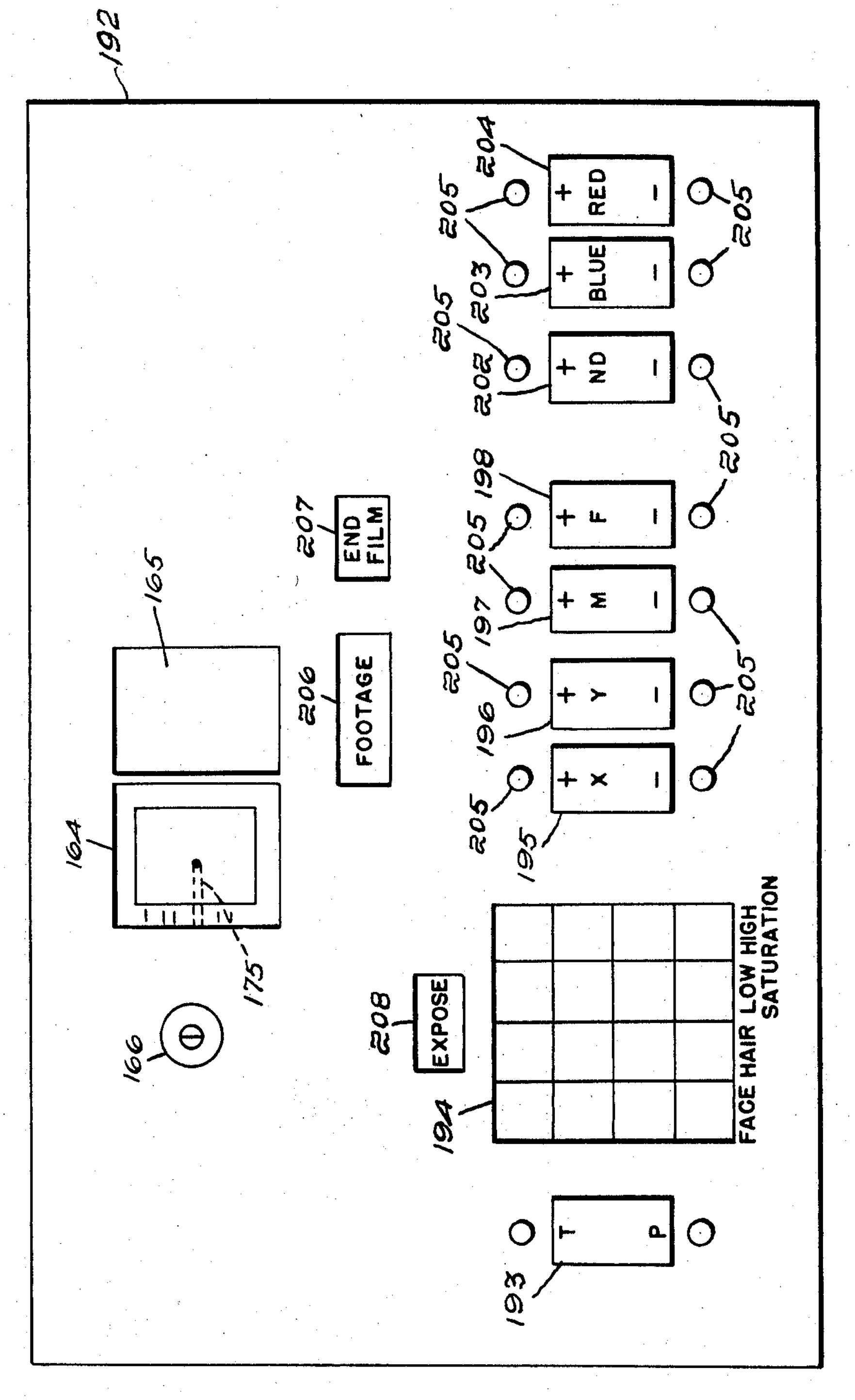
FIG. 4 shows a preferred operator control panel.

Referring now to FIG. 4 there is shown a diagram of a preferred operator control panel 192 including the eyepiece 166, the object image viewing screen 164 and the reference viewing screen 165. In the lower left corner of the panel 192 is a selector switch 193 that is set to either transparency or print positions, depending upon the nature of the input specimen 33. A plurality of push buttons 194 are used to select the proper reference image 172. The buttons 194 also allow the operator to select which of the preselected palettes is most compatible with the background of the image on the input specimen 33. The color data blocks 136 record which palettes are selected for the face, hair and background. Two position control switches 195 and 196 control the motors 156 and 157 to center the input specimen, and a magnification switch 197 controls the position of the input support 147. A focus switch 198 controls the focus of the camera 143. The three filters 144, 145 and 146 shown in FIG. 2 are controlled by the switches 202, 203 and 204 respectively. The switches 193, 195–198, 202–204 are positioned between indicator lights 205 that show when the limit of the range of the control function for each switch has been reached. Disposed below the viewing screens 164 and 165 is a film footage indicator 206 and a film end indicator 207 to show when the end of the film is reached. Above the switches 194 is an expose switch 208 that is actuated to make the exposure of the input specimen 33 after the proper cropping and corrective adjustments are completed.

Operation of the system begins when an operator fixes the input specimen 33 to the input platten 148. Then the operator viewing the panel 192 sees the image of the specimen 33 in the viewing screen 164. The image is positioned, cropped and focused by the operator with the switches 195, 196, 197 and 198. Next, if the image is a portrait of a person, the operator selects a reference image 177 with the switches 194. The reference image 177 that is chosen is the one nearest to the subject person's facial type. The proper palette selections for the chosen facial type are automatically recorded on the color code blocks 136 according to the reference image 177 that appears in the screen 165 during exposure. The switches 194 are also used to select other palettes for the background of the input image and this choice is recorded in the color code blocks 136 at exposure. The probe 175 is then adjusted to cover a medium skin tone on the image and the operator turns his attention to the eyepiece 166. The neutral density filter 202 and the plus or minum blue and plus or minus red filters 203 and 204 are then adjusted until the dividing line between the areas 167 and 168 disappears, indicating that the color balance of the input image, as adjusted by the filters 202, 203 and 204, matches the reference image 177. Finally, the expose button 208 is pressed and an exposure is made recording the input image on the transparency strip 132 with the data 134, the color control patch 135 and the color control blocks 136. The next input specimen 33 is photographed in the same manner. Input specimens 33 of the same type, for example, 35 mm transparencies are grouped together to minimize the time required for photographing. Similar size input specimens 33 eliminate or substantially reduce the time required for framing and cropping.

Obviously, many modifications and variations of the present invention are possible in light of the above teachings. It is to be understood, therefore, that the invention can be practiced otherwise than as specifically described.

What is claimed is:

1. A color standardizer comprising:

optical input means for receiving a multicolored input sample;

a comparator means for analyzing preselected properties of the input sample with respect to a preselected standard;

cropping means for cropping the input sample;

corrective means for altering the preselected properties of the input sample; and camera means for producing an output of the cropped and altered input sample.

2. A color standardizer according to claim 1 wherein said comparator means comprises a selection means for selectively providing said standard from a plurality of preselected standards.

3. A color standardizer according to claim 1 wherein said comparator means comprises selector means for selecting from the input sample individual segments for analysis with respect to the preselected standard.

4. A color standardizer according to claim 1 including auxiliary information means for selectively introducing auxiliary information onto the output photograph.

5. A color standardizer according to claim 4 wherein said auxiliary information means comprises data input means for producing fiducial control indicia on said output photograph.

6. A color standardizer according to claim 1 including feed means for moving strip film through said camera means.

* * * * *